July 26, 1932.  J. C. LINCOLN  1,869,014
ARC WELDING ELECTRODE CONTROL MECHANISM
Original Filed Feb. 25, 1928   3 Sheets-Sheet 1
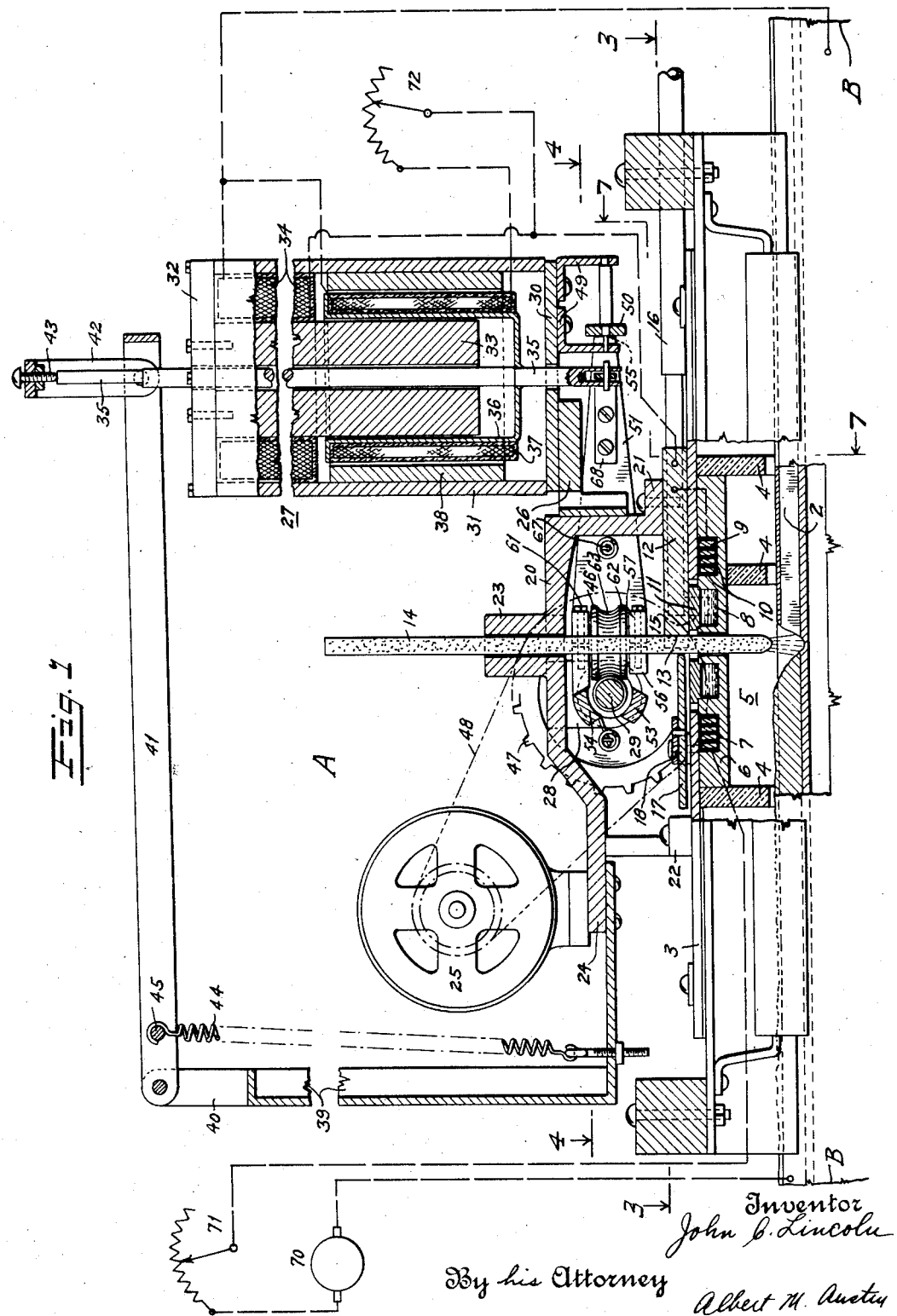

July 26, 1932. J. C. LINCOLN 1,869,014
ARC WELDING ELECTRODE CONTROL MECHANISM
Original Filed Feb. 25, 1928   3 Sheets-Sheet 2
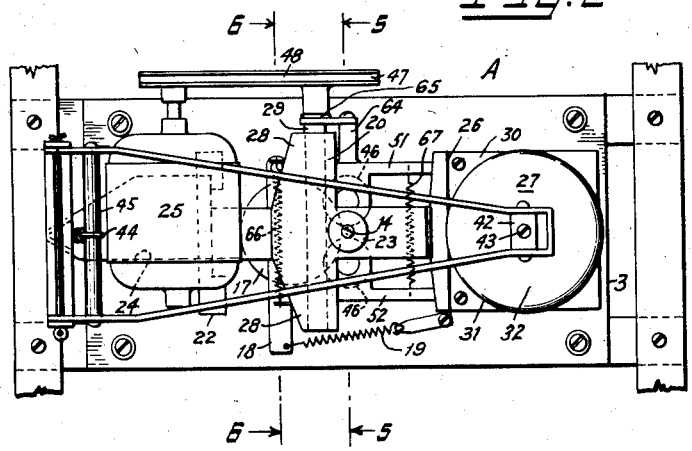
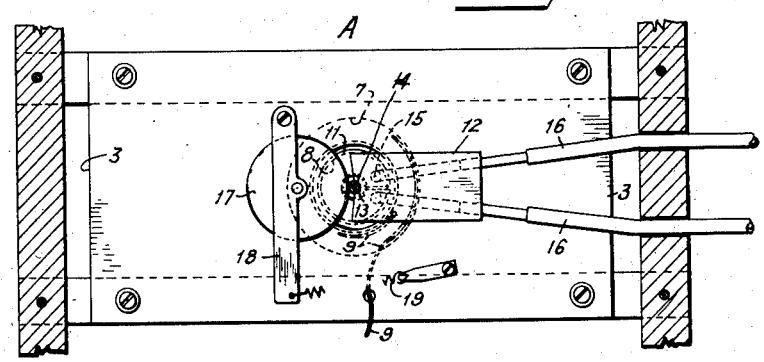
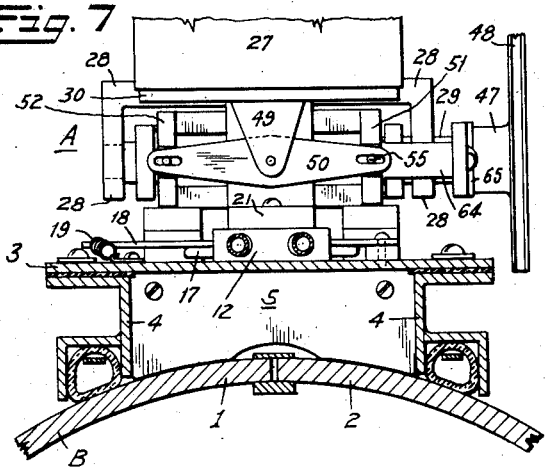
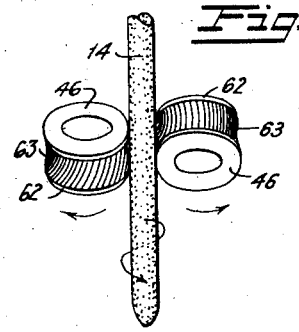

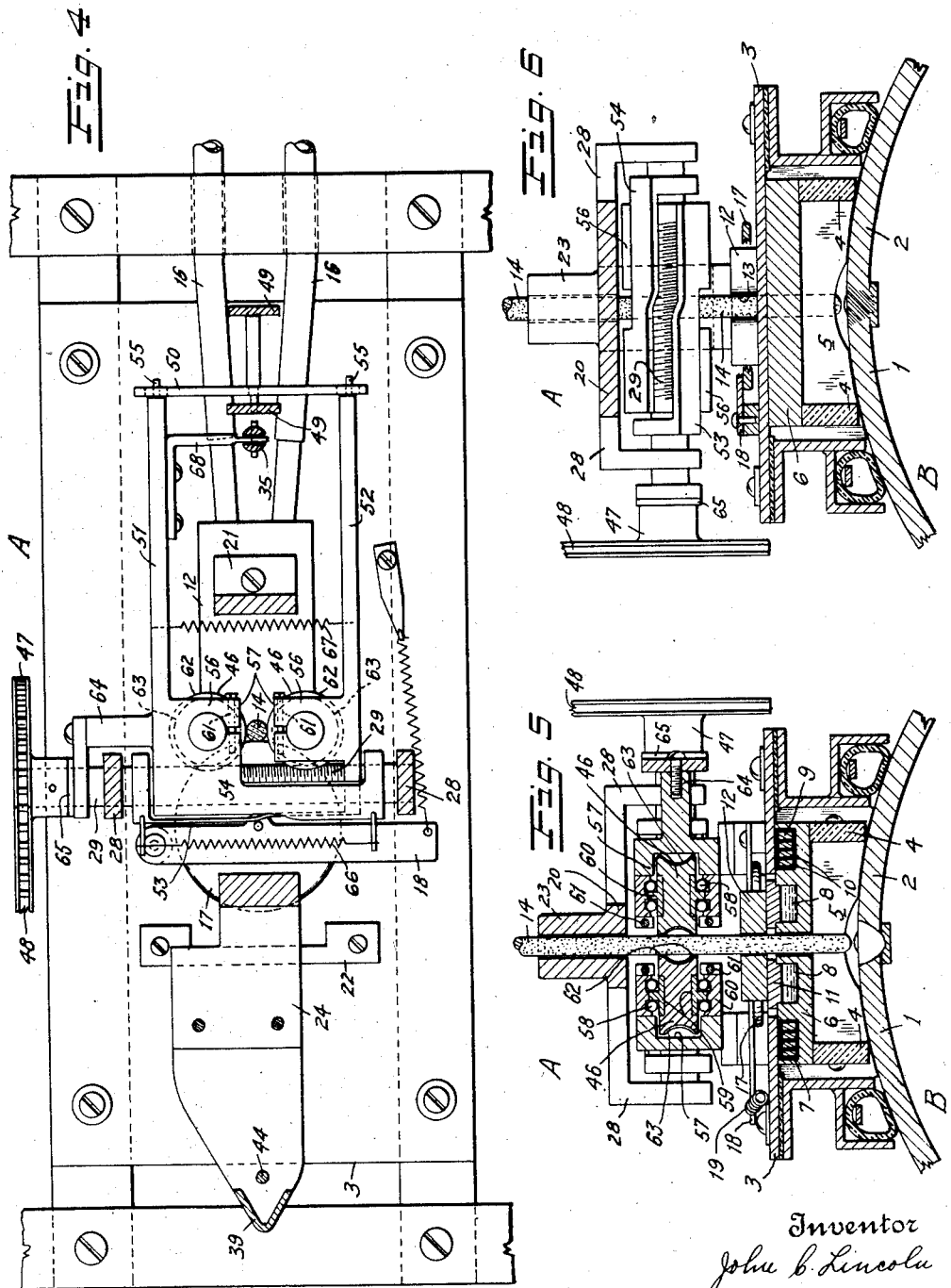

Patented July 26, 1932

1,869,014

UNITED STATES PATENT OFFICE

JOHN C. LINCOLN, OF CLEVELAND, OHIO, ASSIGNOR TO THE LINCOLN ELECTRIC COMPANY, OF CLEVELAND, OHIO, A CORPORATION OF OHIO

ARC WELDING ELECTRODE CONTROL MECHANISM

Application filed February 25, 1928, Serial No. 256,842. Renewed October 28, 1931.

The invention relates in general to electric arc welding, and more particularly, to an automatic arrangement for feeding the electrode and for regulating the length of the arc.

In electric arc welding in order to produce a uniform and smooth weld it is desirable that both the position and the intensity of the arc be maintained substantially constant. The arc must not jump or shift rapidly from point to point between the electrode and the work nor must the voltage thereacross vary. Furthermore, it is desirable that the electrode be consumed uniformly and not more on one side than on the other.

According to the invention the above desirable features are obtained simply and expeditiously. The electrode may be rotated about its own axis to aid in uniform consumption thereof and a suitable mechanism responsive to voltage across the arc is provided for adjusting the electrode to keep the arc length constant. The electrode is mounted in a suitable guide or holder to which the current is conducted and is continuously rotated by a pair of oppositely disposed, frictional wheels mounted on a suitable warpable frame. A solenoid for warping the frame is provided, whose operation is proportional to the voltage across the arc. The warping of the frame causes the wheels to become inclined in opposite directions, this inclination causing a longitudinal movement of the electrode either down or up according to operation of the solenoid. An electromagnet is provided around the electrode to steady the position of the arc and a suitable housing is provided to exclude air from the arc.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is an elevation mostly in section of the apparatus according to the invention;

Fig. 2 is a top plan view;

Figs. 3 and 4 are sections on the lines 3—3 and 4—4 of Fig. 1;

Figs. 5 and 6 are sections taken on the lines 5—5 and 6—6 of Fig. 2;

Fig. 7 is a section taken on the line 7—7 of Fig. 1; and

Fig. 8 is a detail showing the connection of the friction wheels.

In the following description and in the claims parts will be identified by specific names for convenience, but they are intended to be as generic in their application to similar parts as the art will permit.

Like reference characters denote like parts in the several figures of the drawings.

Referring now to the drawings, the welding unit is denoted by A and is shown disposed in welding relation over the edges 1 and 2 of a plate which has been rolled to form a pipe B. The unit A and pipe B are adapted to be moved relatively to cause the unit to weld the edges 1 and 2. An essential part of the unit A is a steel frame plate 3 having suspended therefrom suitable enclosing walls 4 to form a housing 5 to exclude the air from the arc.

The frame plate 3 is provided with an opening, and at the underside thereof a copper magnet plate 6 is provided. The magnet plate 6 is provided with concentric grooves 7 and 8. In the outer groove an electromagnet 9 is provided, the convolutions being suitably insulated from the plate 6 and from each other by suitable insulation 10. The inner groove 8 is provided for the circulation of a cooling medium, such as water and is closed by a flat ring 11.

Disposed over the frame plate 3 is a current contact device made up of a contact block 12 having a suitable notch 13 for contacting the carbon electrode 14. The block 12 is provided with conduits 15 communicating with the groove 8, and flexible conduits 16 are provided for circuating cooling water. The groove 8 is provided with a wall between the conduits 15 to insure circulation of the cooling medium around the groove.

On the opposite side of the electrode 14 is a flat wheel 17 suitably journaled upon a lever 18 which is pivoted to the frame plate 3. A coil spring 19 is provided connecting the end of the lever 18 and the frame plate 3 to cause the wheel to yieldably press the electrode against the contact block. One end of the electromagnet 9 is connected to the contact block 12 to supply the electrode with electricity, the electromagnet and electrode being serially connected.

Supported upon the frame plate 3 is a frame body 20 having three legs providing a three point support, the front leg 21 being secured to the contact block 12 and the rear legs 22 directly to the frame plate. The frame body 20 is provided with a suitable hub-like member 23 spaced slightly from the electrode and is provided with a suitable rear platform 24 for the driving motor 25 and a suitable front platform 26 for a solenoid 27. The frame body 20 is also provided with outwardly extending wings 28 having depending ends in which is journaled a drive screw 29 as hereinafter described.

The solenoid 27 comprises a brass base plate 30 suitably supported by the front platform 26 on top of which is provided an iron cylinder 31 having a top end 32. Disposed within the cylinder and depending from the top end 32 is an iron core 33 between which and the cylinder is a fixed winding 34.

Extending through the top 32 and the iron core 33 is a spindle 35 which is adapted to move up and down. Secured to the lower end of the spindle is a copper tube 36 supporting a movable winding 37. An iron sleeve 38 is provided between the movable winding 37 and the cylinder 31 to complete the magnetic circuit. The magnetic circuit is made up of core 33, top 32, cylinder 31 and sleeve 38.

Secured to the underside of the motor platform 24 is an angle bracket 39 whose upper end has a fork 40. A V-shaped link 41 is pivoted to the forked end by means of a pin. The small end of the V-shaped link 41 has connected thereto a U-shaped strap 42. The upper end of the spindle 35 is provided with a seat on which is positioned a set screw 43 screwed into the strap 42. A coil spring 44 extends between the angle bracket 39 and a cross bar 45 on the V-shaped link 41 to continuously urge the spindle 35 downwardly.

The friction wheels 46 for moving the electrode are warped or inclined by means of a warpable frame. The warpable frame comprises the threaded driving rod 29 which has a sprocket 47 secured thereto, the sprocket being driven by a chain 48 extending from a sprocket on the motor 25. Pivotally mounted between brackets 49 depending from the solenoid by a trunnion is a cross bar 50 having slots in its ends. Longitudinal elements 51 and 52 are provided, each journalled upon the threaded rod 29, element 51 having a long transverse hub portion 53 (Fig. 6) whose ends are journalled on smooth parts of the rod 29, and element 52 having a complementary extended hub portion 54 whose ends are also journalled on smooth portions of the rod. The front ends of the longitudinal elements 51 and 52 have pins 55 which extend in the slots in the cross bar 50. Helical springs 66 and 67 are provided for continuously urging the longitudinal elements toward each other to cause the friction wheels 46 to grip the electrode.

A journal box 56 is mounted on each longitudinal element. Each journal box is forked and each fork 57 is split. A friction wheel 46 is journalled in each journal box, ball bearings 58 being provided having their inner races 59 secured to the wheels 46 and their outer races 60 clamped in split forks 57 of the boxes. Clamping bolts 61 clamp the outer races.

Each wheel 46 has outer peripheral portions 62 for engaging the electrode and a central worm wheel portion 63 meshing the threaded rod 29. The longitudinal element 51 is provided with an extended thrust member 64 having a ball bearing 65 for transferring the end thrust caused by the driving of the friction wheels 46 against the sprocket 47 which is fixed to the threaded rod.

It will be seen that rotation of the threaded rod 29 will cause the friction wheels 46 to rotate in the direction of the arrows (Fig. 8) and will cause the carbon to rotate. The drive of the wheels by means of the threaded rod 29 impresses a force upon the wheels which tends to move the electrode 14 laterally and the extended thrust member 64 is provided for preventing this lateral motion. The pressure of the friction wheels against the electrode must be considerable to rotate the electrode, and the ball bearings 58 insure minimum friction and therefore minimum lateral pressure on the electrode. The springs 66 and 67 provide the necessary pressure of the wheels against the electrode.

The longitudinal member 51 is provided with an angle bracket 68 which is pivoted to the lower end of the spindle 35 so that movement of the spindle will cause warping of the frame.

As shown in Fig. 1 the electromagnet 9 and electrode 14 are connected in series with the source of electricity 70 and ballast resistance 71. The solenoid 27 is connected across the work and electrode 14 so as to respond to the voltage across the arc. The fixed magnet 34 and movable magnet 37 are connected in parallel, the movable magnet 37 having a rheostat 72 in series for controlling the voltage which the solenoid will regulate. It will thus be seen that the voltage across the arc and consequently the arc length may be adjusted by either or both the rheostat 72 or the spring 44.

When the length of the arc is such that the proper voltage is maintained across it, the friction wheels will be parallel and will operate solely to rotate the electrode. If the voltage across the arc increases due to any cause, as, for instance, consumption of the electrode, the solenoid will operate by the increase in voltage to cause the frame to warp, which in turn will cause the wheels to assume an inclined relation in such direction as to cause a downward rotary feed of the carbon. When the arc is corrected, the downward feed will stop. Similarly, if the voltage across the arc should decrease due to any cause, the frame will warp in the other direction and the wheels will incline to cause an upward movement of the electrode.

The apparatus for regulating the voltage across the arc has a certain amount of lag which is used to advantage. It is not desirable that the electrode adjusting apparatus respond immediately to all the slight flickers or changes in voltage across the arc, but only to the average or sustained voltages.

Thus it will be seen that a welding unit is provided having an electrode regulating and rotating mechanism which is efficient and reliable in operation. The electrode rotates continuously to cause even consumption thereof and to aid in the steady operation of the arc. The regulating mechanism, which is responsive to more or less sustained changes in voltage, operates to keep the voltage across the arc substantially constant with a consequent equalization of arc length and heat generated.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In welding apparatus, a body adapted to be placed on the work and having a guide, an electrode seated in said guide, a warpable frame made up of a threaded driving rod, longitudinal elements loosely pivoted on said rod and a cross member pivoted to the ends of said elements, each element having a wheel journalled therein, said wheels engaging opposite sides of said electrode, said wheels having driving relation with said rod, said cross member being pivoted to said body and means for warping said frame.

2. In welding apparatus, a body adapted to be placed on the work and having a guide, an electrode adapted to have an arc drawn between it and the work seated in said guide, a warpable frame made up of a threaded driving rod, longitudinal elements loosely pivoted on said rod and a cross member pivoted to the ends of said elements, each element having a wheel journalled therein, said wheels engaging opposite sides of said electrode and normally in a plane perpendicular to said electrode, said wheels having threaded relation with said rod, said cross member being pivoted to said body, and an electromagnet adapted to be placed across said electrode and work for warping said frame.

3. In welding apparatus, a body adapted to be placed on the work and having a guide, an electrode adapted to have an arc drawn between it and the work seated in said guide, a warpable frame made up of a threaded driving rod, longitudinal elements loosely pivoted on said rod and a cross member pivoted to the ends of said elements, each element having a wheel journalled therein, said wheels engaging opposite sides of said electrode and normally in a plane perpendicular to said electrode, said wheels having threaded relation with said rod, said cross member being pivoted at its middle point to said body, an electromagnet having a fixed winding and a movable winding, a spindle fixed to said movable winding and pivoted to one of said longitudinal members, a spring for normally urging said spindle against the pull of said electromagnet, said movable and stationary windings being connected in parallel and across said electrode and work.

4. In welding apparatus, a body adapted to rest on the work and having a guide, an electrode seated in said guide, a warpable frame made up of a threaded driving rod, longitudinal elements loosely pivoted on said rod and a cross member pivoted to the ends of said elements, each element having a wheel journalled therein, said wheels engaging opposite sides of said electrode and normally in a plane perpendicular to said electrode, said wheels having threaded relation with said rod, said cross member being pivoted at its middle point to said body, means for warping said frame, and a thrust bearing between said elements and said threaded rod.

5. In welding apparatus, an electrode adapted to strike an arc with a member, means for rotating said electrode, and means controlled by the voltage across said arc for moving said electrode longitudinally.

6. In combination, an electrode, a pair of revolving rollers on opposite sides of said electrode to rotate said electrode, and means for changing the planes of said rollers to move said electrode axially.

7. In welding apparatus, a warpable frame, a pair of rollers journalled in said frame, an electrode between said rollers, means for driving said rollers, and means for warping said frame.

8. In combination, an electrode, a friction wheel for rotating said electrode, a drive screw meshing said wheel to drive same, and a thrust bearing between said wheel and screw to prevent lateral pressure on said electrode due to the resistance offered the movement of said wheel by said screw.

9. In welding apparatus, a guide, an electrode in said guide, friction wheels on opposite sides of said electrode for rotating same, said friction wheels having worm wheel teeth, a worm driving said wheels, journal members for said wheels, springs between said journal members to cause said wheels to grip said electrode, and an end-thrust bearing between a journal member and said worm.

10. In combination, an electrode, holding means for said electrode including a roller disposed thereagainst, means to rotate said roller and means to change the angle of the axis of said roller relative to said electrode to change the movement of said electrode.

In testimony whereof I have hereunto set my hand.

JOHN C. LINCOLN.